(12) United States Patent
Mustajarvi et al.

(10) Patent No.: US 10,004,034 B2
(45) Date of Patent: Jun. 19, 2018

(54) NETWORK SELECTION MECHANISMS

(75) Inventors: Jari Pekka Mustajarvi, Espoo (FI); Mika Forssell, Söderkulla (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 191 days.

(21) Appl. No.: 13/520,634

(22) PCT Filed: Jan. 11, 2010

(86) PCT No.: PCT/EP2010/050198
§ 371 (c)(1),
(2), (4) Date: Aug. 22, 2012

(87) PCT Pub. No.: WO2011/082833
PCT Pub. Date: Jul. 14, 2011

(65) Prior Publication Data
US 2012/0309447 A1  Dec. 6, 2012

(51) Int. Cl.
*H04W 48/18* (2009.01)
*H04W 88/06* (2009.01)

(52) U.S. Cl.
CPC ............ *H04W 48/18* (2013.01); *H04W 88/06* (2013.01)

(58) Field of Classification Search
USPC .............................................. 455/41.1, 432.1
See application file for complete search history.

(56) References Cited

U.S. PATENT DOCUMENTS

| 8,391,857 B2 * | 3/2013 | Catalano et al. ........... 455/432.1 |
| 2006/0095954 A1 * | 5/2006 | Buckley .................. H04L 63/08 726/2 |
| 2009/0196265 A1 * | 8/2009 | Mariblanca Nieves .................. H04W 8/065 370/338 |
| 2009/0215447 A1 * | 8/2009 | Catalano ............... H04W 48/18 455/432.1 |

(Continued)

FOREIGN PATENT DOCUMENTS

WO    2009127238 A1    10/2009

OTHER PUBLICATIONS

Motorola: "Handling of policies from H-ANDSF and V-ANDSF"; 3GPP Draft; S2-090272_ EANDSF_HANDLINGOFPOLICIES; 3rd Generation Partnership Project (3GPP), Mobile Competence Centre; 650, Route des Lucioles; F-06921 Sophia-Antipolis Cedex; France; No. Phoenix, Jan. 7, 2009, Jan. 7, 2009 (Jan. 7, 2009), XP050332839, [retrieved on Jan. 7, 2009] p. 1, line 1-p. 3, line 22; p. 3, line 19-p. 4, line 15; p. 4, lines 29-38.

(Continued)

*Primary Examiner* — Junpeng Chen
(74) *Attorney, Agent, or Firm* — Squire Patton Boggs (US) LLP

(57) ABSTRACT

When a user of a mobile communication device is roaming in a visited network, an active network selection policy is formed of one or more partial policies. The partial policies typically include the network selection rules of the visited network, but may also include user home network rules, (Continued)

global network selection rules of the home network and/or further network selection rules of the home network. At least some of the partial policies, such as the network selection policy of the visited network, may be in accordance with Automatic Network Discovery and Selection Function (ANDSF) mechanisms.

17 Claims, 5 Drawing Sheets

(56) References Cited

U.S. PATENT DOCUMENTS

| | | | |
|---|---|---|---|
| 2010/0195643 A1* | 8/2010 | Kodali | H04W 48/18 370/352 |
| 2010/0215026 A1* | 8/2010 | Cheng | H04W 36/385 370/338 |
| 2011/0085498 A1* | 4/2011 | Oba | H04W 48/18 370/328 |

OTHER PUBLICATIONS

"3rd Generation Partnership Project; Technical Specification Group Core Netwok and Terminals; Access to the 3GPP Evolved Packet Core (EPC) via non-3GPP access networks; Stage 3; (Release 9)" 3GPP Standard; 3GPP TS 24.302; 3rd Generation Partnership Project (3GPP), Mobile Competence Centre; 650, Route des Lucioles; F-06921 Sophia-Antipolis Cedex; France; No. V9.1.1, Dec. 21, 2009 (Dec. 21, 2009), pp. 1-54, XP050401495, [retrieved on Dec. 21, 2009] sections 5.1.1-5.1.2, section 6.8.1, section 6.8. 2.2.4, section 6.8.2.3.1.
Nokia et al: "Alignment of ANDSF requirements in SA1, SA2 and CT1" 3GPP Draft; C1-094210, 3rd Generation Partnership Project (3GPP), Mobile Competence Centre; 650, Route des Lucioles; F-06921 Sophia-Antipolis Cedex; France; No. Phoenix; Oct. 12, 2009, Oct. 12, 2009 (Oct. 12, 2009), XP050383044, [retrieved on Oct. 5, 2009], the whole document.
Telcordia et al: "UE reporting access network information discrepancies to ANDSF", 3GPP Draft; S2-093566_S2_73_TD ANDSFDISCREPANCIES-V5, 3rd Generation Partnership Project (3GPP), Mobile Competence Centre; 650, Route des Lucioles; F-06921 Sophia-Antipolis Cedex; France; No. Tallinn, May 5, 2009, May 5, 2009 (May 5, 2009), XP050346625, [retrieved on May 5, 2009] p. 2, line 21-p. 4, line 13.
"3rd Generation Partnership Project; Technical Specification Group Services and System Aspects; Architecture enhancements for non-3GPP accesses (Release 9)" 3GPP Standard; 3GPP TS 23.402, 3rd Generation Partnership Project (3GPP), Mobile Competence Centre; 650, Route des Lucioles; F-06921 Sophia-Antipolis Cedex, France; No. V9.3.0, Dec. 10, 2009 (Dec. 10, 2009), pp. 1-198, XP050400612, [retrieved on Dec. 10, 2009] section 4.8.
Telecom Italia et al: "UE assisted ANDSF"; 3GPP Draft; S2-092593-UE-ASSISTED-ANDSF; 3rd Generation Partnership Project (3GPP), Mobile Competence Centre; 650, Route des Lucioles; F-06921 Sophia-Antipolis Cedex; France; No. Hangzhou, Mar. 30, 2009, Mar. 30, 2009 (Mar. 30, 2009), XP050345841; [retrieved on Mar. 30, 2009] the whole document.
Huawei: "Clarification on the ANDSF in Roaming Case"; 3GPP Draft; S2-091039_CLARIFICATION on the ANDSF in Roaming Case, 3rd Generation Partnership Project (3GPP) Mobile Competence Centre; 650, Route des Lucioles; F-06921 Sophia-Antipolis Cedex; France; No. Budapest; Feb. 10, 2009, Feb. 10, 2009 (Feb. 10, 2009), XP050333460, [retrieved on Feb. 10, 2009] the whole document.
Orange-France Telecom et al: "Home and Visited ANDSF intersystem mobility policies conflicts Ag. Item: 4.3" 3GPP Draft; S1-093041—ANDSF Policies; 3rd Generation Partnership Project (3GPP), Mobile Competence Centre; 650, Route des Lucioles, F-06921 Sophia-Antipolis Cedex; France; No. Roma; Jul. 27, 2009, Jul. 27, 2009 (Jul. 27, 2009), XP050355392 [retrieved on Jul. 27, 2009] the whole document.
Nokia et al: "ANDSF policies received from both V-ANDSF and H-ANDSF" 3GPP Draft; C1-094222 V-ANDSF VS H-ANDSF 24.302, 3rd Generation Partnership Project (3GPP), Mobile Competence Centre; 650, Route des Lucioles; F-06921 Sophia-Antipolis Cedex; France; No. Phoenix, Oct. 12, 2009, Oct. 12, 2009 (Oct. 12, 2009), XP050383055 [retrieved on Oct. 15, 2009] the whole document.
Orange-France Telecom et al: "Home and visited ANDSF policies conflict resolution" 3GPP Draft; S1-093042—CR 22.278 ANDSF; 3rd Generation Partnership Project (3GPP), Mobile Competence Centre; 650, Route des Lucioles; F-06921 Sophia Antipolis Cedex; France; No. Roma; Jul. 27, 2009, Jul. 27, 2009 (Jul. 27, 2009), XP050355393 [retrieved on Jul. 27, 2009] the whole document.
PCT International Search Report and Written Opinion for Corresponding International Application No. PCT/EP2010/050198, dated Oct. 1, 2010.

* cited by examiner

NETWORK SELECTION MECHANISMS

The invention relates to network selection mechanisms, such as Automatic Network Discovery and Selection Function (ANDSF) mechanisms.

Many mobile communication devices are able to make use of more than one communication access technology. For example, some mobile communication devices are able to make use of both the 3GPP standard and WLAN (wireless local area network).

Providing a mobile communication device with alternative communication technologies has a number of potential advantages. For example, the mobile communication device may be able to function in areas where only one of a number of access technologies is available. Also, if a user requires a low cost connection, then the cheapest of a number of available connection options can be chosen. Alternatively, if a user wants to send a large amount of data over a connection, then a connection with a high available bandwidth can be chosen.

It is known to provide mobile communication devices with information regarding access technologies that are available. Access Network Discovery and Selection Function (ANDSF) mechanisms allow a mobile operator to provide subscriber devices with inter-system mobility policies for automatic, intelligent network selection in a heterogeneous network environment, where a plurality of different non-3GPP access technologies are available together with 3GPP or fulfilling gaps where 3GPP is not available.

FIG. 1 is a block diagram of a system, indicated generally by the reference numeral 1, comprising a mobile communication device 2, an ANDSF server 4, a first mobile network 6 and a second mobile network 8.

In the use of the system 1, the ANDSF server 4 provides information to the mobile communication device 2 regarding the priority in which the access networks available to the mobile device (such as the networks 6 and 8) should be accessed. The mobile communication device requests this priority information from the ANDSF server 4, and the ANDSF server returns the requested data to the mobile communication device. The mobile communication device 2 may choose the network to be used with ANDSF communication according to existing network selection information or by any other means available to the mobile device.

FIG. 2 is a flow chart showing an algorithm, indicated generally by the reference numeral 10, showing an exemplary use of the system 1 by the mobile communication device 2.

The algorithm 10 starts at step 12, where ANDSF information is obtained. The ANDSF information may, for example, be provided (by the ANDSF server 4) on request from the mobile communication device 2 (in a "pull" mode) or may be provided in a manner determined and initiated by the ANDSF server (in a "push" mode). In a push mode, the ANDSF server may provide information to a mobile communication device without that mobile device requesting the information.

The ANDSF server 4 provides a number of policies for connecting the mobile communication device 2 to networks (such as the first mobile network 6 or the second mobile network 8). Priorities are assigned to the various policies and, at step 14 of the algorithm 10, the highest priority valid policy is applied by the mobile communication device 2. A policy is considered to be "valid" if it meets a number of validity conditions. Such conditions may, for example, relate to location or the time of day. The highest priority valid policy is often referred to herein as an "active policy".

The policy selected at step 14 may have a number of access network options associated with it. The access network options will be prioritized within the policy. At step 16 of the algorithm 10, the highest priority access network option of the selected policy is selected at the mobile communication device 2. Of course, is some embodiments, the selected policy may have only a single access network option.

The algorithm 10 moves to step 18 where it is determined whether or not the highest priority access network option of the selected policy has resulted in a successful connection to an available network. If a network connection has been made, then the algorithm 10 terminates at step 24. If a connection has not been made then the algorithm 10 moves to step 20, where it is determined whether or not the selected policy has any more (lower priority) access network options available.

It should be noted that ANDSF information does not define when a network connection is considered to be good enough. Even if a mobile communication device is able to connect to a network, the network quality may still be low. It is left to the mobile communication device to decide whether a given network fulfills its own requirements for the connection. If the network quality is too low, then the mobile communication device can choose the next preferred network in the policy.

If no further access network options exist, the algorithm 10 terminates at step 24. If further access network options do exist, then the next highest priority access network is selected at step 22. The algorithm 10 then returns to step 18, where it is determined whether or not the newly selected access network results in a successful connection to an available network. If a connection is made, then the algorithm 10 terminates at step 24. If a connection is not made, then the algorithm 10 moves to step 20, as discussed above.

The algorithm 10 continues until either a successful connection is made or all access network options of the selected policy have been tried. In some implementations of ANDSF systems, if the highest priority valid policy does not result in a connection being made, then no further efforts are made to make a connection. In other implementations, if the highest priority valid policy does not result in a connection being made, then the next highest priority policy (if any) is used and steps 16 to 24 of the algorithm 10 are repeated using that policy.

In addition to providing network selection policies, ANDSF allows mobile operators to provide access network discovery information (ANDI) to assist user equipment (UE) in detecting access networks specified in the ANDSF policy rules. Policies are used to list preferred access networks in any given location or time.

Discovery information consists of radio technology specific information like frequencies and channels. This is particularly important, for example, for WiMAX where blind scanning of the whole frequency domain can take a considerable period of time (perhaps as much as 15 minutes or more) and can use considerable battery resources.

Both policies and discovery information can have validity area, expressed for example using 3GPP Cell Identifier or tracking area data. Typically, an ANDSF server runs in an operator network and delivers the policies and discovery information to a user device either on request from the user device (pull mode) or at the operator's preference (push mode).

When the ANDSF mechanism was first proposed, it was only intended to provide data that is valid within the area of a single public land mobile network (PLMN). This network (the "home" network) of the user device was the only network for which ANDSF data was provided. More recently, it has been proposed to provide roaming support using ANDSF data. This means that when a particular user device moves from a home network to a visited network, the user device can still make use of ANDSF information.

FIG. 3 is a block diagram of a system, indicated generally by the reference numeral 30, comprising a first mobile communication device 32, a home operator ANDSF (H-ANDSF) server 34, a second mobile communication device 36 and a visited operator ANDSF (V-ANDSF) server 38. As shown in FIG. 3, the first mobile communication device 32 and the H-ANDSF server 34 are located within a home public land mobile network (HPLMN) and the second mobile communication device 36 and the V-ANDSF server 38 are located within a visited public land mobile network (VPLMN). The HPLMN and VPLMN are separated in FIG. 3 by a dotted line 39. Accordingly, in the system 30, the first mobile communication device 32 is in a home network and the second mobile communication device 36 is roaming in the VPLMN network.

In the system 30, the mobile communication device 32 that is in its home network (i.e. served by the HPLMN), simply uses the ANDSF information provided by the H-ANDSF server 34. The second device 36, which is roaming, uses ANDSF information provided by the relevant V-ANDSF server (i.e. the server 38).

Allowing the V-ANDSF server 38 to provide local ANDSF network selection policies enables the VPLMN to control its own radio resources among 3GPP and non-3GPP networks. Nevertheless, there are circumstances where it might be advantageous to allow the H-ANDSF server 34 to provide some input to the network selection policies provided to the second mobile communication device 36 that is roaming in the VPLMN.

Consider, for example, a scenario in which a home operator has made a global agreement with a network service provider and would like to encourage its users to use that network service provider when roaming, wherever possible. The V-ANDSF server 38 would be unaware of this agreement and would therefore have no reason to include such a network in the V-ANDSF data provided to the device 36.

Of course, it is possible to disable the provision of V-ANDSF policies entirely, so that a device that is roaming can be programmed to use a preferred network selection policy. Such an arrangement, however, is not able to take advantage of the network information known to the V-ANDSF server 38, which information might be useful, for example, in the event that the network preferred by the H-ANDSF server was not available.

The present invention seeks to address at least some of the problems outlined above.

The present invention provides a method comprising: selecting a first (possibly a partial) access network (e.g. a mobile telecommunications network or a WiFi network or some other wireless network) selection policy (such as an ANDSF policy) provided by a visited network (e.g. by an ANDSF server of the visited network) in which a mobile communication device is located (or roaming); selecting a second (possibly a partial) access network selection policy (such as an ANDSF policy) that has been provided by a home network of the mobile communication device; and applying at least one of the selected first and second access network selection policies. Thus, the invention enables, for example, H-ANDSF data to override aspects of the V-ANDSF data. Accordingly, significant flexibility is provided.

The present invention also provides a mobile communication device comprising: a selection module adapted to select a first (possibly a partial) access network selection policy (e.g. a V-ANDSF policy) provided for (typically by) a visited network in which the mobile communication device is located (i.e. in which the device is roaming) and further adapted to select a second (possibly a partial) access network selection policy (e.g. an H-ANDSF policy) that has been provided by a home network of the mobile communication device; and a policy application module adapted to apply at least one of the selected first and second access network selection policies. The policy application module may be adapted to order the first and second access network selection policies depending on their relative priorities. Alternatively, or in addition, the policy application module may apply the selected access network selection policies in priority order unless and until a successful network connection is made.

The device may further comprise a policy generation module adapted to generate a combined access network selection policy from the first and second access network selection policies. The combined access network selection policy may be generated in a number of different ways, for example, based on the relative priorities of different policies, or based on a predefined order.

The device may further comprise a policy implementation module that is adapted to implement the said access network selection policies.

The present invention further provides a system comprising a mobile communication device, a visited network and a home network, wherein: a server associated with the visited network (e.g. a V-ANDSF server) provides a first access network selection policy to the mobile communication device; a server associated with the home network (e.g. an H-ANDSF server) provides a second access network selection policy to the mobile communication device; and the mobile communication device applies at least one of the selected first and second access network selection policies. The mobile communication device may generate a combined access network selection policy from the first and second access network selection policies. The mobile communicate device may apply the selected access network selection policies in priority order unless and until a successful network connection is made. This may be based on a combined access network selection policy, but the generation of such a policy is not an essential feature of all embodiments of the invention.

Applying at least one of the first and second access network selection policies may comprise ordering the first and second access network selection policies depending on their relative priorities. The ordering may be predefined; for example, global H-ANDSF policies may always be applied before V-ANDSF policies. Alternatively, the ordering may be dependent on data (such as a relative priority flag) included in the access network selection policies. Furthermore, the various policies themselves may have mutual priorities and/or validity conditions. Write access to a relative priority flag (if used) may be restricted.

Applying at least one of the selected first and second access network selection policies may include generating a combined access network selection policy (e.g. a combined active VPLMN policy) from the first and second access network selection policies and applying the said combined access network selection policy. The step of generating the combined access network selection policy may include ordering the first and second network selection policies, for example based on the relative priority of those policies. The first and second access network selection policies may have validity conditions (which may or may not be different). Also, individual policies from which the first and second access network selection policies are selected may have different validity conditions. In one form of the invention, a new combined policy is created whenever individual partial policy validity condition becomes invalid. A particular policy may be valid only when the mobile communication device is roaming in a visited network, or may be valid regardless of whether the mobile communication device is within the home network or within a visited network.

Applying at least one of the selected first and second access network selection policies may comprise applying the selected access network selection policies in priority order unless and until a successful network connection is made. Such an arrangement does not necessarily require the generation of a combined access network selection policy. Accordingly, a highest priority policy may be tried first and, only if applying that policy is unsuccessful is the next highest priority policy tried.

Selecting the first access network selection policy may comprise selecting the highest priority valid policy for the visited network. A policy is considered to be "valid" if it meets a number of validity conditions. Such conditions may, for example, relate to location (e.g. network ID, cell ID or some other form of geographical location data) or the time of day.

Selecting the second access network selection policy may comprise selecting the highest priority valid policy for the home network.

The second access network selection policy may be (or at least may include) a global policy that remains valid when the mobile communication device is roaming. The second access network selection policy may include one or more H-ANDSF policies (sometimes referred to as "global" policies) that are valid only when the mobile communication device is roaming in a visited network and one or more policies (sometimes referred to as "local" policies) that are valid only when the mobile communication device is located within the home network.

The invention may further comprise selecting a third access network selection policy that has been provided by the home network of the mobile communication device. Indeed, there may be a plurality of network selection policies provided by the home network. The various policies provided by the home network may include priorities, both amongst themselves, and with respect to the policy provided by the visited network.

In some forms of the invention, multiple network selection policies may be provided by the home network, wherein at least one of the network selection policies provided by the home network is considered before the first network selection policy provided by the visited network and at least one of the network selection policies provided by the home network is considered after the first network selection policy provided by the visited network. Thus, in some forms of the invention, the HPLMN may provide two policies when a user device is roaming—a first policy that is considered before VPLMN provided policies and a second policy, with validity conditions, that may be considered after the VPLMN provided policies.

The invention may further comprise selecting a user-defined access network selection policy. In some forms of the invention, the/each user-defined access network selection policy (if any) is applied before either the first or second access network selection policies. The user-defined access network selection policies often relate to connection options that might be available at the user's home, or at the user' place of work; however, this is not essential. For example, a user-defined access network selection policy may be setup for a WiFi connection that is available at a friend of the user, which friend lives in a different country.

The invention yet further provides a computer program, comprising: code (or some other means) for selecting a first (possibly a partial) access network (e.g. a mobile telecommunications network or a WiFi network) selection policy provided by a visited network in which a mobile communication device is located; code (or some other means) for selecting a second (possibly a partial) access network selection policy that has been provided by a home network of the mobile communication device; and code (or some other means) for applying at least one of the selected first and second access network selection policies. The computer program may be a computer program product comprising a computer-readable medium bearing computer program code embodied therein for use with a computer.

Exemplary embodiments of the invention are described below, by way of example only, with reference to the following numbered drawings.

Figure 4:
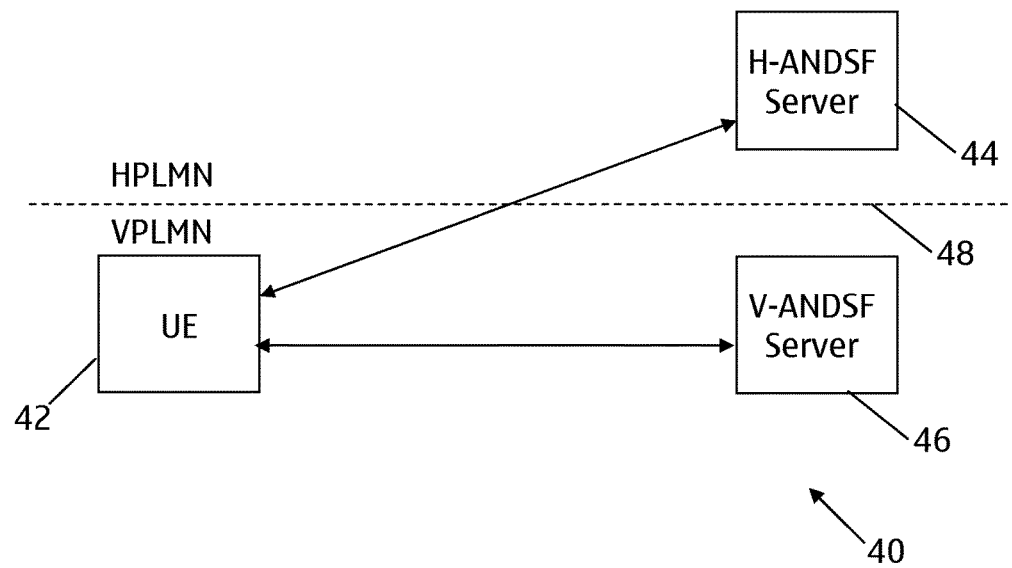
FIG. 4 is a block diagram showing a system for providing network selection policies for a user device in accordance with an aspect of the invention.

FIG. 4 is a block diagram showing a system, indicated generally by the reference numeral 40, for providing network selection policies for a user device in accordance with an aspect of the invention. The system 40 comprises a mobile communication device 42, a home operator ANDSF (H-ANDSF) server 44 and a visited operator ANDSF (V-ANDSF) server 46. The mobile communication device 42 and the V-ANDSF server 46 are located within a VPLMN (i.e. the mobile communication device 42 is roaming in the VPLMN network). The HPLMN and VPLMN are separated in FIG. 4 by a dotted line 48.

The mobile communication device 42 receives ANDSF policy information from both the H-ANDSF server 44 and the V-ANDSF server 46 and stores that data locally. As described in detail below, the mobile communication device 42 is able to combine network selection policy data received from both the H-ANDSF server 44 and the V-ANDSF server 46 into a combined network selection policy for use when roaming in the VPLMN.

Figure 5:
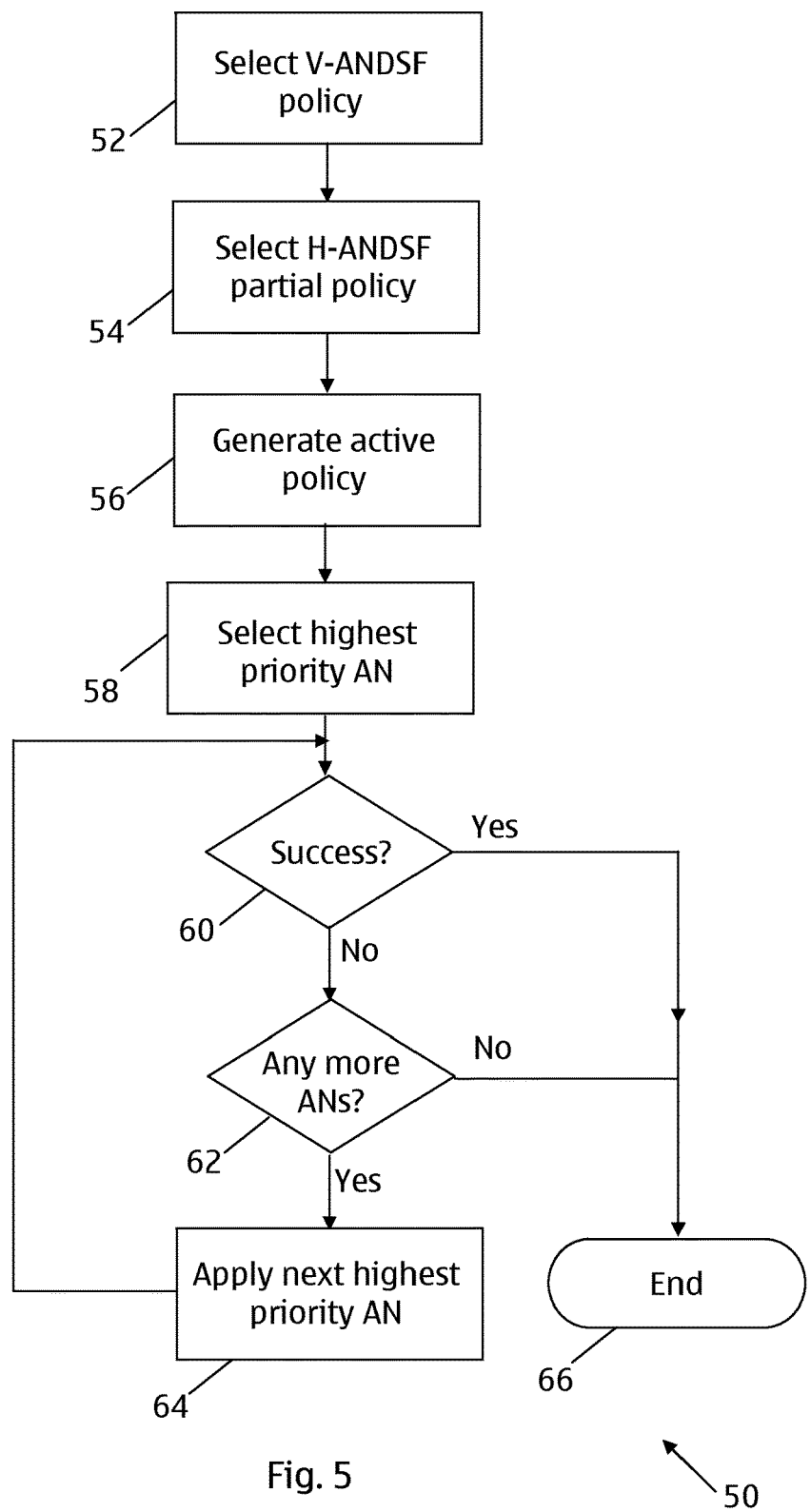
FIG. 5 is a flow chart showing a network access selection algorithm in accordance with an aspect of the invention.

FIG. 5 is a flow chart showing an algorithm, indicated generally by the reference numeral 50, showing an exemplary use of the system 40 in accordance with an aspect of the present invention.

The algorithm 50 starts at step 52, where the mobile communication device 42 selects the highest priority valid V-ANDSF policy. This selection is made in the same way in which the selection would be made in the system 30. As is known in the art, ANDSF policies typically include one or more validity conditions defining when the policies are valid. ANDSF policies may also include priority rankings such that the mobile communication device can determine which of the ANDSF policies stored at the mobile communication device are valid and, of those, which has the highest priority.

Next, at step 54, the mobile communication device 42 selects the highest priority valid partial H-ANDSF policy. This policy is selected in a similar manner to the V-ANDSF policy selected at step 52.

With a V-ANSDF policy selected at step 52 and a partial H-ANDSF policy selected at step 54, the next step is to generate a combined active VPLMN policy that includes both the V-ANDSF policy data and the partial H-ANDSF policy data. This is carried out at step 56. The step 56 may be implemented in a number of ways. For example, the partial H-ANDSF policy may include a flag indicating whether the H-ANDSF policy should be considered before or after the V-ANDSF policy. In other words, the partial H-ANDSF policy may indicate whether it should be given a higher or a lower priority than the V-ANDSF policy.

With an active policy defined, the algorithm 50 moves to step 58, where the active policy (i.e. the combined active VPLMN policy) is used. At step 58, the active policy is used to determine the highest priority access network. In a similar manner to the algorithm 10 described above, it is determined (at step 60) whether or not applying the highest priority access network results in a successful network connection. If so, the algorithm 50 terminates at step 66; otherwise the algorithm moves to step 62.

Figure 1:
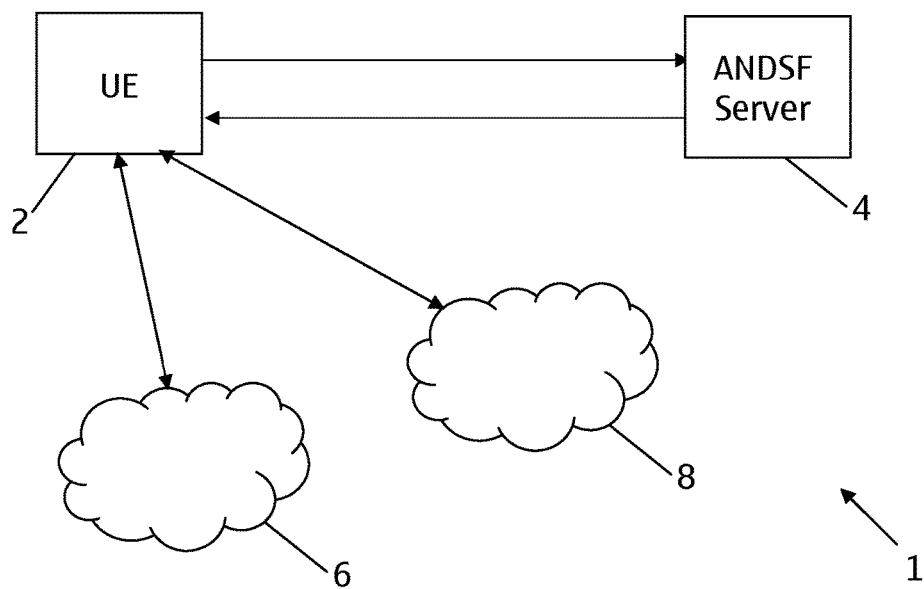
FIG. 1 is a block diagram of a system in which the present invention may be used.
Figure 2:
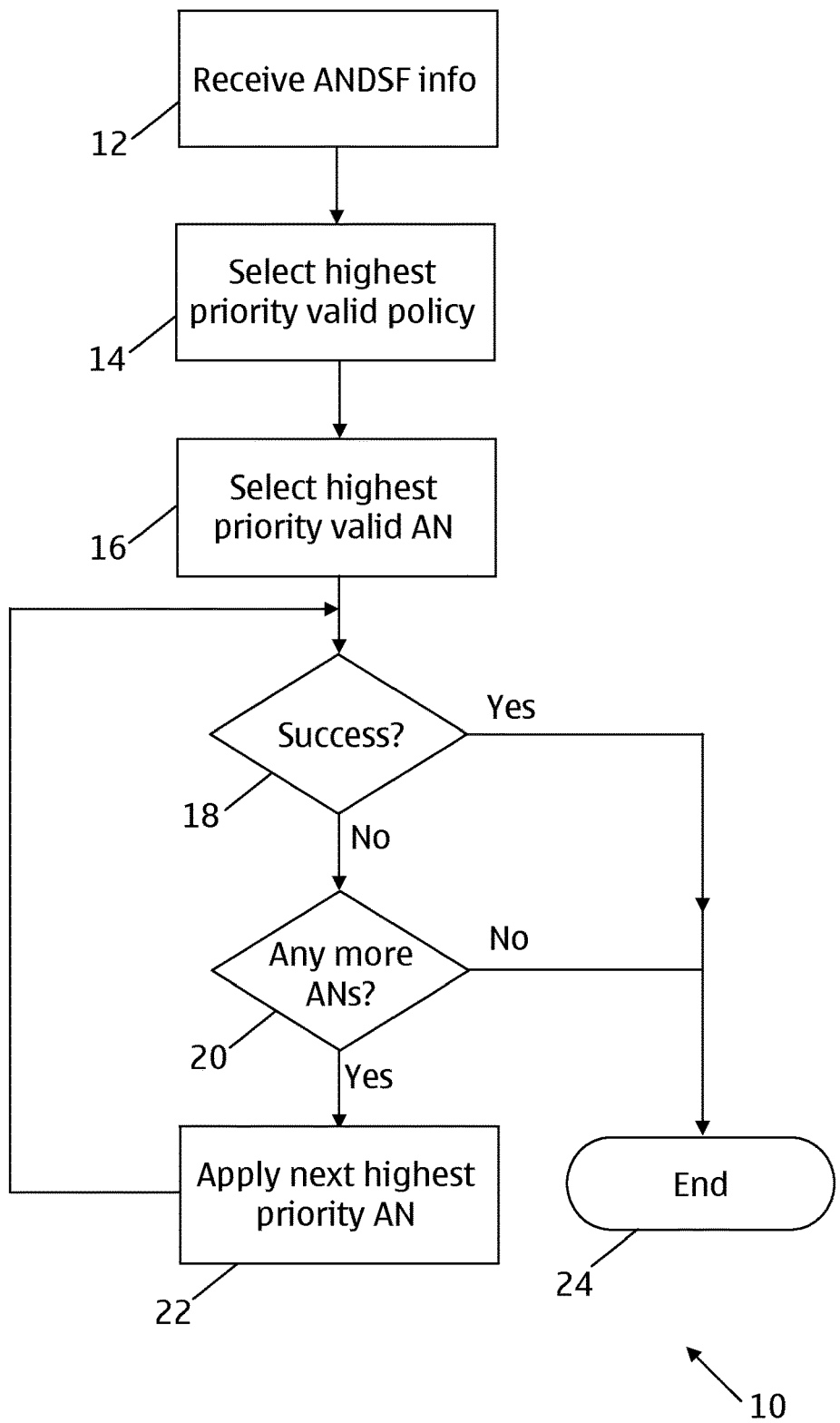
FIG. 2 is a flow chart showing a network access selection algorithm.
Figure 3:
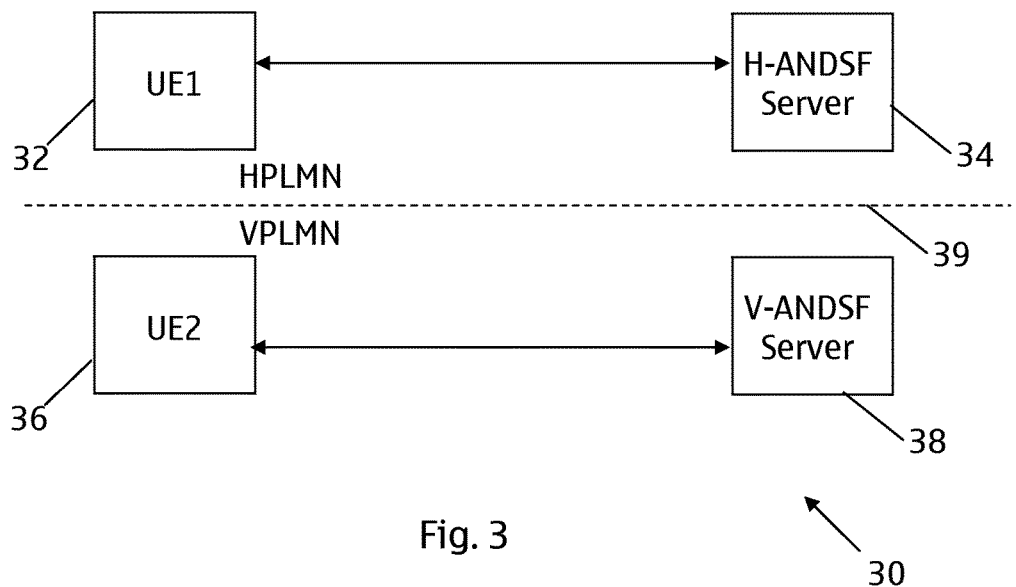
FIG. 3 is a block diagram showing a system for providing network selection policies for user devices.

At step 62, it is determined whether there are any (lower priority) access networks in the active policy that can be tried. If so, the next access network in the policy is selected at step 64 and the algorithm returns to step 60. If not, the algorithm 50 terminates at step 66. Of course, as discussed above with reference to FIG. 3, the algorithm 50 could go on to evaluate the next highest priority policy (if any).

The algorithm 50 continues until either a successful connection to a network is made or until all access networks in the active policy have been tried.

In some forms of the invention, the VPLMN policies are not partial. In such an arrangement, the HPLMN is not aware of VPLMN policy details and cannot order them in any way. It can only consider the 'active' (i.e. the selected) VPLMN policy as one and provide relative priority for the HPLMN partial policies for current active VPLMN policy (before or after and of course mutual priority within the HPLMN partial policies). An active VPLMN policy combined with potential partial HPLMN policies creates the combined active VPLMN policy for network selection.

In the algorithm 50, a single H-ANDSF partial policy and a single V-ANDSF policy are selected. This is not essential to all forms of the invention. For example, multiple V-ANDSF and/or multiple H-ANDSF policies could be used. The various policies may each be provided with a relative priority so that the generation of the active policy at step 56 can place the various policies in priority order. Alternatively, the relative priority of V-ANDSF and H-ANDSF policies could be defined, such that either all of the V-ANDSF policies are tried before any of the H-ANDSF partial policies are tried, or vice versa, such that all of the H-ANDSF partial policies are tried before any of the V-ANDSF policies are tried.

As described above, policies from different sources may be assigned different priorities, so that a mobile communication device can determine an order in which to attempt to use the policies. In one form of the invention, the order is either an H-ANDSF partial policy followed by a V-ANDSF policy, or vice-versa. There are, however, alternative arrangements. For example, one exemplary policy order is as follows:

1. User-defined network rules. These rules have the highest priority.
2. Home operator global ANDSF rules.
3. Visited operator ANDSF rules.
4. Home operator ANDSF rules. These rules have the lowest priority.

Accordingly, any user-defined network rules included in an active policy are tried first. If none exist, or if they do not result in a successful network connection, then home operator global ANDSF rules are tried. Next, if necessary, V-ANDSF rules are tried before, finally, H-ANDSF rules are tried. Thus, there may be two levels of H-ANDSF policy—those that are tried before VPLMN policies (e.g. the home operator global ANDSF policies referred to above) and those that are tried after the VPLMN policies (e.g., the home operator ANDSF rules referred to above).

The exemplary policy order outlined above may be implemented in a number of ways. For example, the user-defined network rules and/or the home operator ANDSF rules may be omitted. The home operator global ANDSF rules and the visited operator ANDSF rules may be combined in a single active rule, as described above. Indeed, in the event that the user-defined network rules and the home operator ANDSF rules are omitted and the home operator global ANDSF rules and the visited operator ANDSF rules are provided in a single active rule, the policy reverts to the policy described above with reference to FIG. 5.

"User-defined network rules" refer to network selection policies that have been defined by a user. For example, a user may specify that a particular WiFi access point should always be used, if it is available. Often, the user-defined network rules relate to home network rules (i.e. what happens in the user's home, or perhaps in the user's place of work), but this is not essential to all embodiments of the invention. For example, a particular user might also have a friend in foreign country and might use the user-defined network rules to specify a preference to use WiFi at that friend's house when that WiFi network available.

In the present example, the "user-defined network rules" placeholder is not affected by operator (HPLMN or VPLMN ANDSF) provisioned rules, since operator provisioned ANDSF rules are stored after user-defined network rules, and have lower priorities. In some implementations of the invention, there may be no user-defined network rules.

A home operator may define "Home operator global ANDSF rules" (i.e. one or more global H-ANDSF partial policies) that are prioritized over any network operator ANDSF rules. These rules are sometimes valid in either the HPLMN (home network) or an VPLMN (visited network) and also in cases where a mobile communication device connects to non-3GPP network not linked to HPLMN or VPLMN (for example standalone WiFi access provider or another network provide as a "connection aggregator"). In some forms of the invention, such home operator global ANDSF rules are valid in all locations other than in the home network, although such ANDSF rules could have validity condition like any other policy.

By way of example, consider the scenario described above in which a home operator has made a global agreement with a network service provider and would like to encourage its users to use that network service provider when roaming, wherever possible. The H-ANDSF server could specify the details of the network service provider with which it has a global agreement as a partial policy and could provide this as a home operator global ANDSF partial policy. When a mobile communication device is roaming, the partial policy provided by the H-ANDSF server can be incorporated into an active policy in combination with the relevant V-ANDSF policy. In one exemplary embodiment, the partial policy may be provided without a validity condition, so that it is always considered. In other forms of the invention, the partial policy may be valid only when the device is roaming. Relative priorities can also be set to indicate whether the partial policy should precede or follow the V-ANDSF policy components in the active rule. In a further exemplary embodiment of the invention, a home operator may have a global agreement with a particular hotel chain to use that hotel's WLAN access networks around the world. In such an embodiment, home operator global ANDSF rules may prompt a mobile device to seek a WLAN network of that hotel chain when roaming, before trying the network options specified by the relevant V-ANDSF server. In another example, home operator may have a global agreement with a particular enterprise to use enterprise intranet and WiFi network when available.

A visited network operator knows details about local access networks and partnerships and thus allowing VPLMN ANDSF to provide these details to roaming mobile communication device removes the need to have this information configured and maintained in HPLMN. In the present example, visited operator ANDSF rules are treated in case "User home networks rules" (if any) and "Home operator global ANDSF rules" (if any) do not provide an active rule that should be followed by the mobile communication device. Of course, the priority order described here is by way of example only. In some embodiments of the invention, the order could be different; for example, the visited operator ANDSF rules may have a higher priority than the home operator global ANDSF rules.

Finally, in the present example, the lowest priority rules are the home operator ANDSF rules. The home operator ANDSF rules may be applied in the event that none of the preceding rules provided an active rule set that could be followed by the relevant mobile communication device, or in the event that the mobile communication device is operating within the HPLMN domain (i.e. is not roaming).

Figure 6:
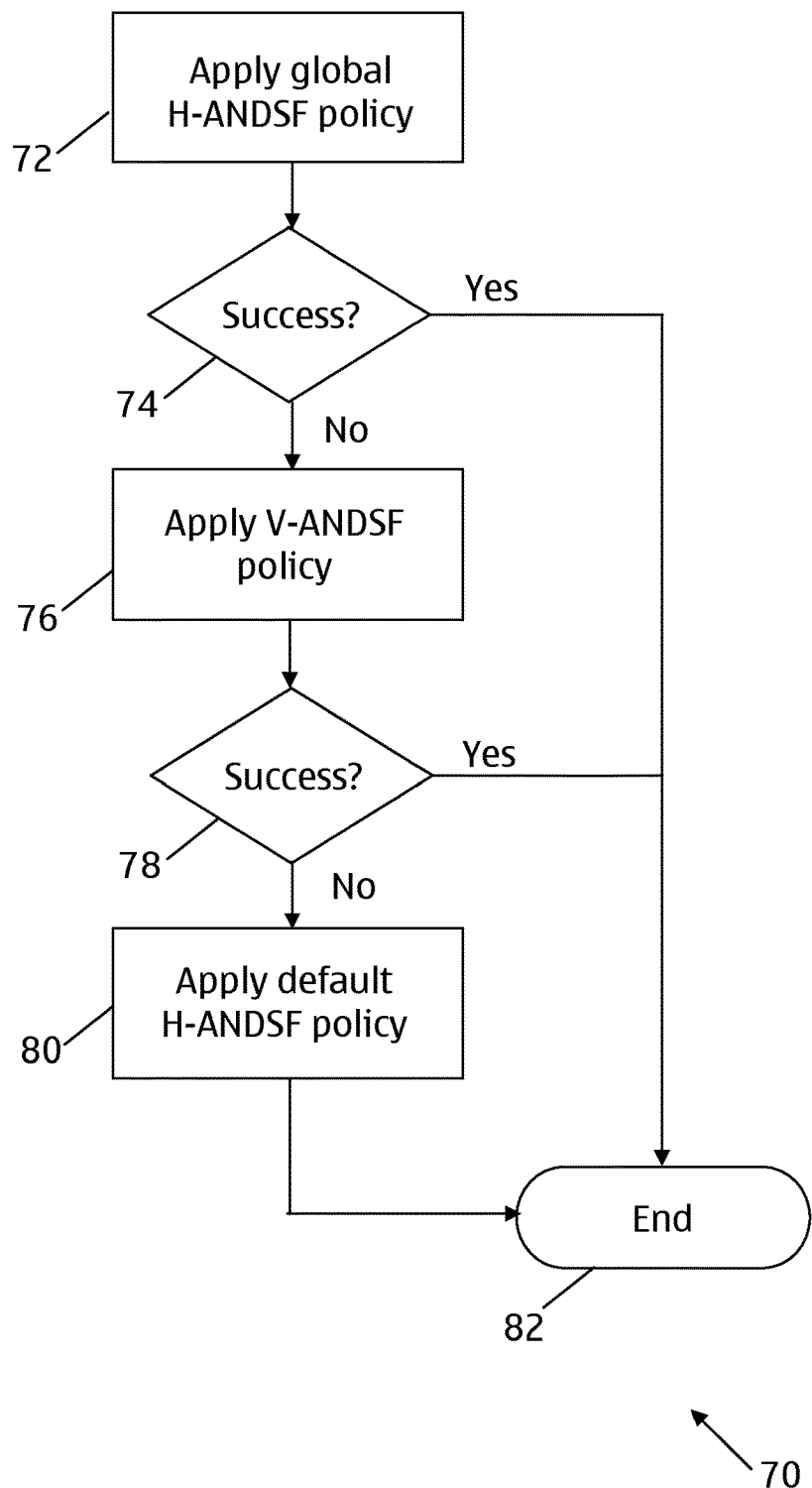
FIG. 6 is a flow chart showing a network access selection algorithm in accordance with an aspect of the invention.

In the algorithm 50, partial policies are selected and then formed into an active policy that is then applied. This is not essential to all embodiments of the invention. For example, particular partial policies could be applied in turn, with the next partial policy only being selected if the application of the previous partial policy did not result in a successful network connection. By way of example, an algorithm, indicated generally by the reference numeral 70, implementing such an arrangement is shown in FIG. 6.

The algorithm 70 starts at step 72, where a global H-ANDSF partial policy is applied, if such a policy exists. Next, at step 74, it is determined whether step 72 resulted in a successful network connection. If so, the algorithm 70 terminates at step 82; otherwise the algorithm moves to step 76. At step 76, the relevant V-ANDSF policy is applied.

Next, at step 78, it is determined whether step 76 resulted in a successful network connection. If so, the algorithm 70 terminates at step 82; otherwise the algorithm moves to step 80. At step 80, the default home operator ANDSF rules are applied. The algorithm 70 then terminates at step 82.

Of course, although the algorithm 70 shows the global H-ANDSF policy being applied (at step 72) in preference to the V-ANDSF policy (at step 76), the priority order could be different. Furthermore, user home network rules, as described above, could also be applied, possibly in a step preceding the step 72 of the algorithm 70. Moreover, the VPLM operator might be able to set a flag indicating whether or not the VPLMN network selection policies take precedence over the HPLMN policies.

Prioritizing VPLMN ANDSF rules before Home operator (non-global) ANDSF rules also allows a VPLMN network operator to perform traffic steering and, for example, to offload cellular traffic to WiFi for roaming subscribers.

The term "default H-ANDSF policy" is used above with reference to a number of embodiments of the invention. In some forms of the invention, the H-ANDSF policy is not necessarily a "default" policy. Default policies are generally created without any validity conditions, or perhaps just a single or a small number of validity conditions (such as requiring that the mobile device is roaming before the policy is active). In general, any of the "default" policies referred to above could be replaced with other policies that have detailed validity conditions.

By way of example, device Management Objects (MO) can be used to transfer ANDSF and/or network selection template(s) to a mobile communication device. ANDSF Management Objects (MO) may contain for example XML language used to define placeholders and priorities for different rule sets.

There are many mechanisms that could be used to enable a complete active policy to be generated. For example, each PLMN could define named partial policies which are usable within that particular PLMN. In such an arrangement, only the HPLMN or HPLMN equivalent may be able to define unnamed partial policies for visited PLMNs. A named partial policy could be directly referred to by an active policy whereas unnamed partial policies could be included by the mobile communication device into the active policy without the active policy knowing anything about it or its existence.

Named partial policies define a set of preferred access technologies and an active policy can include one or more named partial policies directly preferred access technologies chain. The term "named partial policy" can be a synonym for a set of prioritized access networks, such that instead of repeating the same network list for each policy, a reference to the named partial policy can be given. Named partial policies do not necessarily need validity conditions; they can share the validity conditions from the active policy. Named partial policies could have own validity conditions; they would be considered within the active policy before including the named partial policy into the complete active policy.

Unnamed partial policies are provided by the HPLMN and can be used when the mobile communication device is roaming. The HPLMN might define validity conditions for the unnamed partial policy, which the mobile communication device would have to consider before including that policy in the active policy. The mobile communication device may select the highest priority valid unnamed partial policy and include this to the active policy. Unnamed partial policy does not contribute to the active policy selection by any means.

An unnamed partial policy might have a flag indicating whether it should be considered before or after the access technologies in the active rule. It would also be possible to allow more than one unnamed partial policy to be included into the active policy. In this case each unnamed partial policy should have priority value, which allows the mobile communication device to order them for inclusion to the active policy. This would also require that the mobile communication device provides relative priority to the active policy in respect to active unnamed partial policies.

The mobile communication device might be able to provide discovery information for partial policies, but this is not essential to all embodiments of the present invention.

The present invention is not restricted to use with ANDSF mechanisms. The invention could be used with other forms of network selection data.

Where the invention is used with PLMN selection rules, references to "HPLMN" should be read to include an "Equivalent HPLMN", as is known in the art. The terms "Equivalent HPLMN" and "Equivalent PLMN" are used for the same purpose, for example, in the 3GPP specifications. An operator may share radio network with other operators (MVNO case or for coverage reasons). Equivalent PLMNs are those PLMNs that are allowed to be used by the user device as if user device is in the home PLMN and hence share the highest priority during network selection attempts. HPLMN provides the list to the user device when the user device makes a connection with the home operator (potentially via some other PLMN) using ATTACH, ROUTING AREA UPDATE or LOCATION UPDATE procedures.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising:
   selecting a first access network selection policy provided by a visited network in which a mobile communication device is located;
   selecting a second access network selection policy that has been provided by a home network of the mobile communication device;
   applying at least one of the selected first and second access network selection policies;
   applying user-defined network policies; and
   generating a combined access network selection policy from the first and second access network selection policies, the combined access network selection policy including both the first and second access network selection policies,
   wherein the applying at least one of the selected first and second access network selection policies comprises ordering the first and second access network selection policies depending on a relative priority flag included in at least one of the first or second access network selection policies,
   wherein the user-defined network policies have a higher priority than the first and second access network policies, and
   wherein the user-defined network policies are applied and stored before the application of the first and second access network selection policies.

2. The method as claimed in claim 1, wherein the applying of at least one of the selected first and second access network selection policies comprises applying the selected access network selection policies in successive priority order unless and until a successful network connection is made.

3. The method as claimed in claim 1, wherein the selecting of the first access network selection policy comprises selecting a highest priority valid policy for the visited network.

4. The method as claimed in claim 1, wherein the selecting of the second access network selection policy comprises selecting a highest priority valid policy for the home network.

5. The method as claimed in claim 1, wherein the second access network selection policy remains valid when the mobile communication device is roaming.

6. The method as claimed in claim 1, wherein the second access network selection policy comprises one or more policies that are valid when the mobile communication device is roaming in a visited network, and an additional one or more policies that are valid only when the mobile communication device is located within the home network.

7. The method as claimed in claim 1, further comprising selecting a third access network selection policy that has been provided by the home network of the mobile communication device.

8. The method as claimed in claim 1, wherein multiple network selection policies are provided by the home network, and wherein at least one of the network selection policies provided by the home network is considered before the first network selection policy provided by the visited network and at least one of the network selection policies provided by the home network is considered after the first network selection policy provided by the visited network.

9. The method as claimed in claim 1, further comprising selecting the user-defined network policies, wherein the user-defined network policies are user-defined access network selection policies.

10. A mobile communication device comprising:
    a selection module adapted to select a first access network selection policy provided by a visited network in which the mobile communication device is located and further adapted to select a second access network selection policy that has been provided by a home network of the mobile communication device;
    a policy application module adapted to apply at least one of the selected first and second access network selection policies; and
    a policy generation module adapted to generate a combined access network selection policy from the first and second access network selection policies, the combined access network selection policy including both the first and second access network selection policies,
    wherein the applying at least one of the selected first and second access network selection policies comprises ordering the first and second access network selection policies depending on a relative priority flag included in at least one of the first or second access network selection policies,
    wherein the policy application module is further adapted to apply user-defined network policies,
    wherein the user-defined network policies have a higher priority than the first and second access network policies, and
    wherein the user-defined network policies are applied and stored before the application of the first and second access network selection policies.

11. The mobile communication device as claimed in claim 10, further comprising a policy generation module adapted to generate a combined access network selection policy from the first and second access network selection policies.

12. The mobile communication device as claimed in claim 10, further comprising:
    a receiving module adapted to receive information regarding a priority in which access networks available to the mobile communication device should be accessed, wherein the access networks available to the mobile communication device comprise the visited network and the home network.

13. A system comprising a mobile communication device, a visited network and a home network, wherein:
a server associated with the visited network provides a first access network selection policy to the mobile communication device;
a server associated with the home network provides a second access network selection policy to the mobile communication device; and
the mobile communication device applies at least one of the selected first and second access network selection policies, and generates a combined access network selection policy from the first and second access network selection policies, the combined access network selection policy including both the first and second access network selection policies,
wherein the applying at least one of the selected first and second access network selection policies comprises ordering the first and second access network selection policies depending on a relative priority flag included in at least one of the first or second access network selection policies,
wherein the mobile communications device further applies user-defined network policies,
wherein the user-defined network policies have a higher priority than the first and second access network policies, and
wherein the user-defined network policies are applied and stored before the application of the first and second access network selection policies.

14. The system as claimed in claim 13, wherein the mobile communication device receives information regarding a priority in which access networks available to the mobile communication device should be accessed, wherein the access networks available to the mobile communication device comprise the visited network and the home network.

15. A non-transitory computer readable medium encoded with instructions that, when executed in hardware, performs a process, the process comprising:
selecting a first access network selection policy provided by a visited network in which a mobile communication device is located;
selecting a second access network selection policy that has been provided by a home network of the mobile communication device;
applying at least one of the selected first and second access network selection policies;
applying user-defined network policies; and
generating a combined access network selection policy from the first and second access network selection policies, the combined access network selection policy including both the first and second access network selection policies,
wherein the applying at least one of the selected first and second access network selection policies comprises ordering the first and second access network selection policies depending on a relative priority flag included in at least one of the first or second access network selection policies,
wherein the user-defined network policies have a higher priority than the first and second access network policies, and
wherein the user-defined network policies are applied and stored before the application of the first and second access network selection policies.

16. The method as claimed in claim 1, further comprising: receiving information regarding a priority in which access networks available to the mobile communication device should be accessed, wherein the access networks available to the mobile communication device comprise the visited network and the home network.

17. The non-transitory computer readable medium as claimed in claim 15, the process further comprising:
receiving information regarding a priority in which access networks available to the mobile communication device should be accessed, wherein the access networks available to the mobile communication device comprise the visited network and the home network.

* * * * *